United States Patent
Shen et al.

(10) Patent No.: US 10,158,477 B2
(45) Date of Patent: Dec. 18, 2018

(54) METHOD AND APPARATUS FOR DEFINING CARRIER AGGREGATION GROUP SETS

(71) Applicant: AT&T MOBILITY II LLC, Atlanta, GA (US)

(72) Inventors: Yi Shen, Seminole, FL (US); Yonghui Tong, Alpharetta, GA (US); Choonghor Woon, Flower Mound, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 126 days.

(21) Appl. No.: 15/222,353

(22) Filed: Jul. 28, 2016

(65) Prior Publication Data

US 2018/0034616 A1 Feb. 1, 2018

(51) Int. Cl.
*H04L 5/00* (2006.01)
*H04L 29/06* (2006.01)

(52) U.S. Cl.
CPC .......... *H04L 5/0094* (2013.01); *H04L 5/0098* (2013.01); *H04L 65/105* (2013.01); *H04L 65/1006* (2013.01); *H04L 65/1016* (2013.01); *H04L 65/1046* (2013.01); *H04L 65/1069* (2013.01)

(58) Field of Classification Search
CPC ................. H04B 7/2121; H04B 7/2123; H04J 2203/0069; H04Q 2213/394; H04W 72/04; H04W 72/12; H04W 76/00
USPC ......................................................... 370/329
See application file for complete search history.

(56) References Cited

U.S. PATENT DOCUMENTS

| | | | |
|---|---|---|---|
| 8,717,866 B2 | 5/2014 | Dinan et al. | |
| 8,824,403 B2 | 9/2014 | Oh | |
| 9,136,990 B2 | 9/2015 | Marinier et al. | |
| 9,277,398 B2 | 3/2016 | Yamada | |
| 9,306,723 B2 | 4/2016 | Nory et al. | |
| 9,307,446 B2 | 4/2016 | Choi et al. | |
| 9,319,194 B2 | 4/2016 | Dinan | |
| 9,331,833 B2 | 5/2016 | Tseng et al. | |
| 9,332,512 B2 | 5/2016 | Sebire et al. | |
| 9,844,058 B2 * | 12/2017 | Xiao | H04W 72/048 |
| 2010/0240359 A1 | 9/2010 | Wu et al. | |

(Continued)

OTHER PUBLICATIONS

"4G Americas LTE Carrier Aggregation", 4G Americas, Oct. 2014, 53 pages.

*Primary Examiner* — Robert J Lopata
(74) *Attorney, Agent, or Firm* — Guntin & Gust, PLC; Jay Anderson

(57) ABSTRACT

Aspects of the subject disclosure may include, for example, a device including a processing system including a processor and a memory that stores executable instructions that, when executed by the processing system, facilitate performance of operations. The operations can include receiving an enquiry regarding capability of the device to engage in a communication session over a network, identifying a plurality of component carriers available for carrier aggregation, and generating a group identifier for a group of combinations of the component carriers. The group identifier indicates the capability of the device to engage in the communication session using any of the combinations in the group. The operations can also include transmitting a message including the group identifier. Other embodiments are disclosed.

20 Claims, 10 Drawing Sheets

(56) References Cited

U.S. PATENT DOCUMENTS

| | | | |
|---|---|---|---|
| 2012/0178465 A1* | 7/2012 | Lin | H04W 24/10 |
| | | | 455/450 |
| 2013/0322370 A1* | 12/2013 | Fong | H04W 72/048 |
| | | | 370/329 |
| 2014/0362748 A1 | 12/2014 | Barany et al. | |
| 2015/0256300 A1 | 9/2015 | Lin et al. | |
| 2015/0327269 A1* | 11/2015 | Kim | H04W 72/0453 |
| | | | 370/329 |
| 2016/0050576 A1 | 2/2016 | Dalsgaard et al. | |
| 2016/0198452 A1* | 7/2016 | Takahashi | H04W 28/18 |
| | | | 370/329 |
| 2017/0064541 A1* | 3/2017 | Uchino | H04L 5/1469 |
| 2017/0086175 A1* | 3/2017 | Yasukawa | H04W 28/06 |
| 2017/0111910 A1* | 4/2017 | Sundar | H04W 72/0453 |
| 2017/0181172 A1* | 6/2017 | Susitaival | H04W 72/082 |
| 2017/0251478 A1* | 8/2017 | Kim | H04W 72/0453 |
| 2017/0367073 A1* | 12/2017 | Murugan | H04W 72/02 |
| 2018/0019898 A1* | 1/2018 | Takahashi | H04L 25/0208 |

\* cited by examiner

100

METHOD AND APPARATUS FOR DEFINING CARRIER AGGREGATION GROUP SETS

FIELD OF THE DISCLOSURE

The subject disclosure relates to carrier aggregation in wireless communications, and more particularly to a method and apparatus for defining group sets of carriers for aggregation.

BACKGROUND

Carrier aggregation (CA) is a technique for providing increased bandwidth in wireless communications (for example, between a mobile user device and a network). In a typical network, a single communications channel (also referred to as a component carrier or component band) can have a bandwidth of 1.4-20 MHz. Aggregation of five component bands can provide a CA bandwidth of up to 100 MHz.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for generating a group identifier for combinations of bands for carrier aggregation. Other embodiments are described in the subject disclosure.

One or more aspects of the subject disclosure include a method that comprises receiving a message from a communication device regarding capability of the communication device to engage in a communication session over a network; the message can include a coded item corresponding to a predetermined group of carrier aggregation band combinations. The coded item indicates the capability of the communication device to engage in the communication session using any of the band combinations in the group. The method also comprises facilitating the communication session in accordance with the capability.

One or more aspects of the subject disclosure include a device comprising a processing system including a processor and a memory that stores executable instructions that, when executed by the processing system, facilitate performance of operations. The operations comprise receiving an enquiry regarding capability of the device to engage in a communication session over a network, identifying a plurality of component carriers available for carrier aggregation, and generating a group identifier for a group of combinations of the component carriers. The group identifier indicates the capability of the device to engage in the communication session using any of the combinations in the group. The operations also comprise transmitting a message including the group identifier.

One or more aspects of the subject disclosure include a machine-readable storage medium comprising executable instructions that, when executed by a processor, facilitate performance of operations. The operations comprise receiving a message from a communication device regarding capability of the communication device to engage in a communication session over a network. The message includes a group identifier for a predetermined group of carrier aggregation band combinations; the group identifier indicates the capability of the communication device to engage in the communication session using any of the band combinations in the group. The operations also comprise facilitating the communication session in accordance with the capability.

Figure 1:
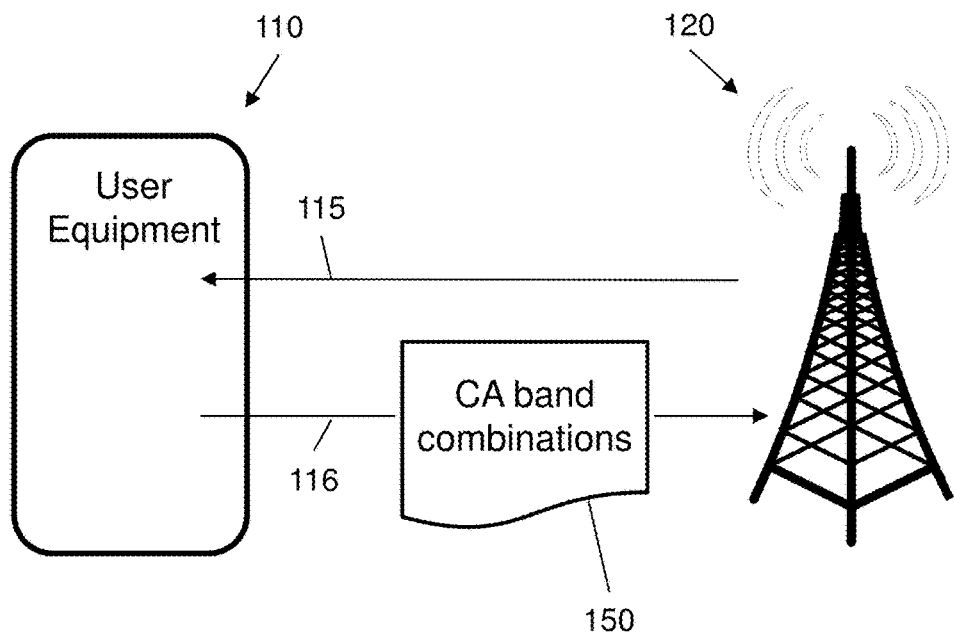
FIG. 1 schematically illustrates Radio Resource Control (RRC) signaling in which a user equipment (UE) transmits a capability message.

FIG. 1 schematically illustrates an arrangement 100 in which user equipment (UE) 110 initiates a communication session using network 120. As part of the Radio Resource Control (RRC) signaling between the UE and the network, the network sends a capability enquiry 115 to the UE; the UE responds with a capability message 116. The capability message includes a description 150 of the CA component bands, and/or combinations of bands, which can be used in the communications session by the UE. It is understood that the component bands referred to herein have predetermined identifiers, for example Band 2, Band 4, Band 12, Band 30, etc.

In accordance with the disclosure, a description of the CA band combinations for the communication session can be expressed by a single item in the UE capability message.

Figure 2:
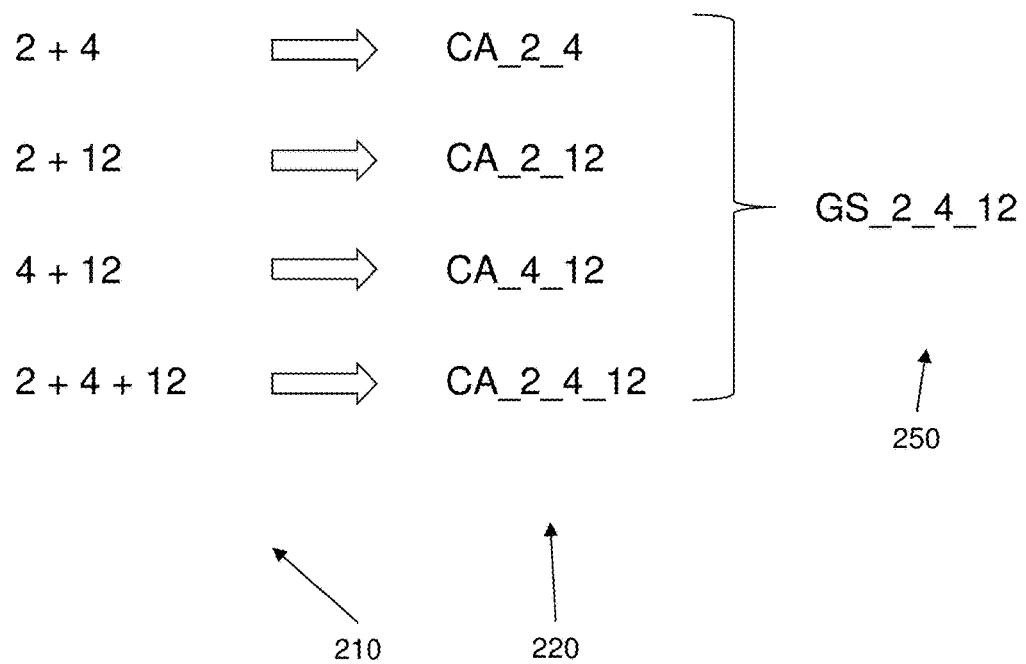
FIG. 2 depicts an illustrative embodiment in which a set of CA band combinations is defined using a group set (GS) identifier.

FIG. 2 depicts a procedure 200 in which a set of CA band combinations is defined using a group set (GS) identifier, in accordance with an embodiment of the disclosure. In this example, the UE is capable of communicating using a group 210 of bands comprising any combination of Band 2, Band 4, and Band 12. A complete list 220 of CA band combinations can then be expressed as "CA_2_4, CA_2_12, CA_4_12, CA_2_4_12." In this embodiment, these combinations are represented by a single identifier 250 that comprises "GS" (group set) and the identifiers of the component bands. The two-letter combination "GS" thus indicates that all possible combinations (two-way and three-way) of Band 2, Band 4, and Band 12 are included in the UE capability message.

Figure 3:
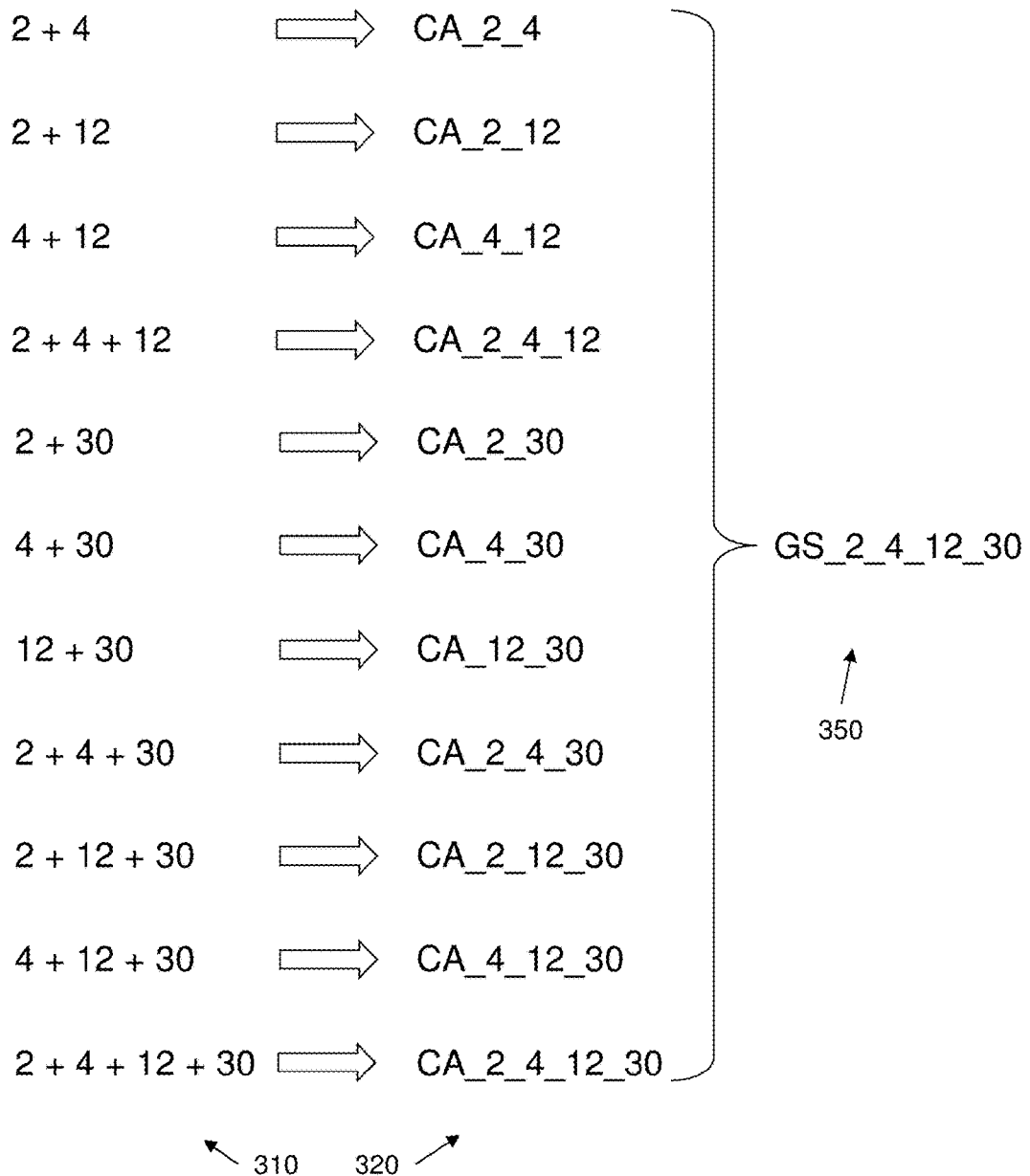
FIG. 3 depicts an illustrative embodiment in which a new band is added to the set of CA band combinations shown in FIG. 2.

FIG. 3 depicts a procedure 300 in which a band (in this example, Band 30) is added to the group set defined in FIG. 2. FIG. 3 shows a list 310 of the two-way, three-way and four-way combinations of bands in the group, and a list 320 of the corresponding CA combination identifiers. In this embodiment, these combinations are represented by a single identifier 350 that comprises "GS" and the identifiers of the three original bands and the added band.

Figure 4:
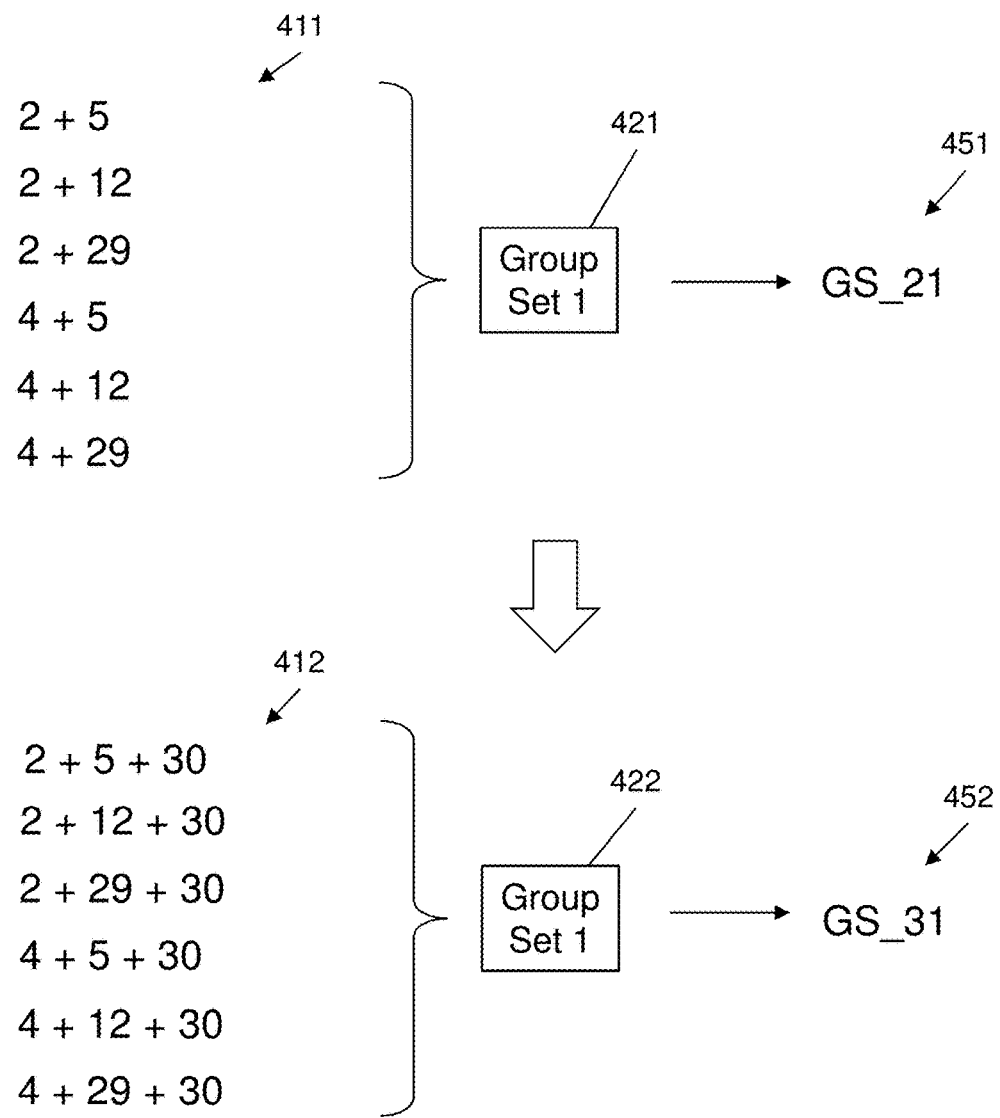
FIG. 4 depicts an illustrative embodiment for encoding identifiers for CA group sets.

FIG. 4 illustrates another embodiment 400 in which a predefined group of CA band combinations is used. In this example, a group 411 including specific combinations of Band 2, Band 4, Band 5, Band 12, and Band 29 is defined as a group set 421 and labeled "Group Set 1." In general, the defined group set does not include all the possible combinations of the component bands. Furthermore, in this embodiment the CA band combinations in the group set are all n-way combinations where n is a predefined number. In this example, all of the combinations in Group Set 1 are two-way, and the set of combinations 421 can be represented by an identifier 451 comprising "GS_21," the "2" indicating two-way combinations and the "1" indicating Group Set 1.

In this embodiment, addition of a band (for example, Band 30) to each combination in Group Set 1 yields a modified group set 422 that comprises the combinations in list 412. These combinations can thus be represented by an identifier 452 comprising "GS_31," the "3" indicating three-way combinations and the "1" indicating the (now modified) group set.

Figure 5:
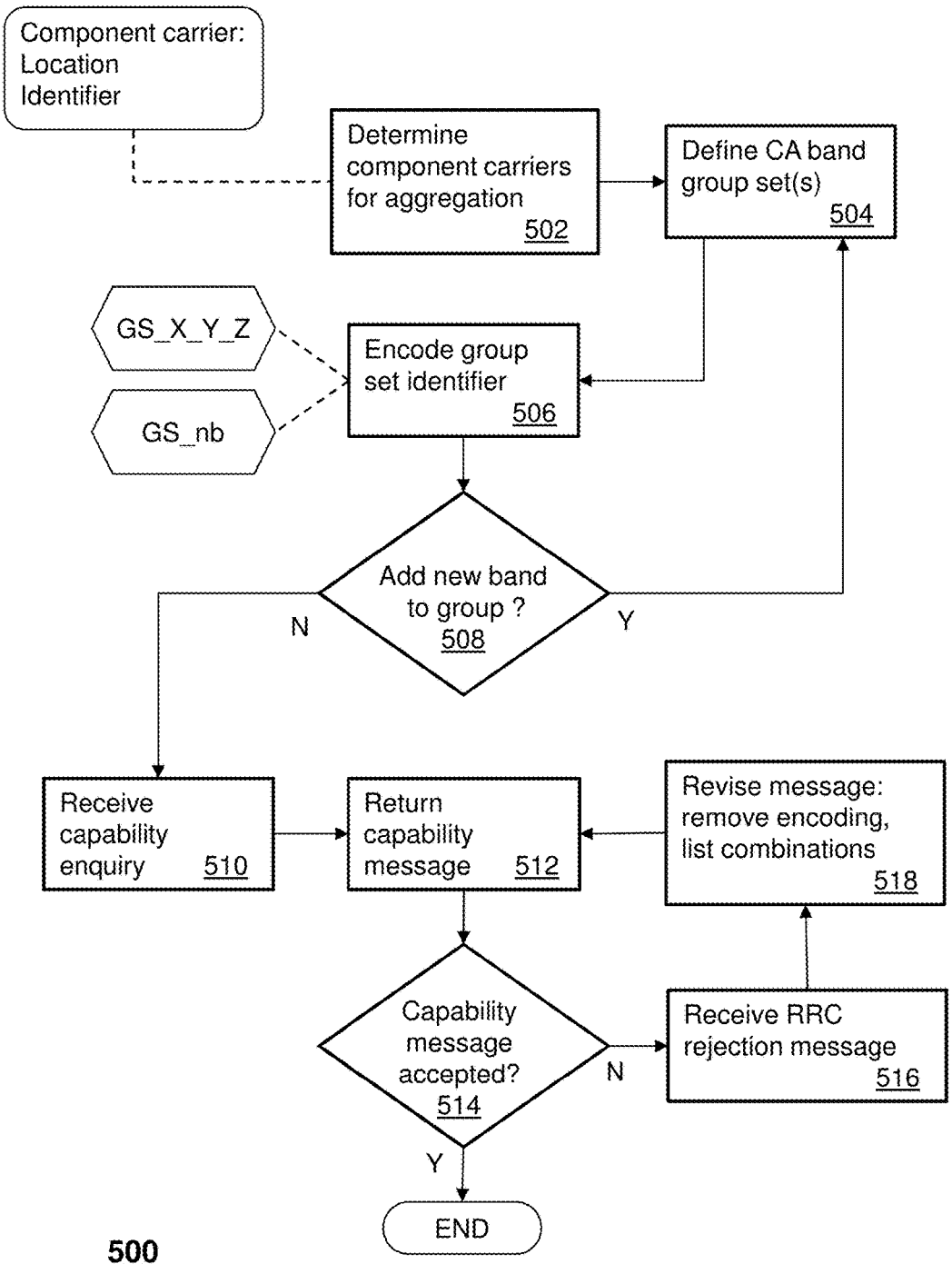
FIG. 5 is a flowchart illustrating a method for defining and encoding group set identifiers for CA in a UE capability message.

FIG. 5 is a flowchart illustrating a method 500 for defining and encoding group set identifiers for CA in a UE capability message, in accordance with embodiments of the disclosure. In a particular embodiment, method 500 can be performed by processor of a UE 110 preparing a capability message 116 in RRC signaling to a network 120.

In step 502, the UE processor determines the component carriers that can be used for CA in the communication session. In this example, each of the component carriers has a prescribed numeric identifier and a location on the wireless communication spectrum. In step 504, the CA band group sets are defined. These group sets can include all combinations of a set of bands (for example, according to procedures 200-300), or a defined set of combinations (for example, according to procedure 400). The group sets are then assigned identifiers (step 506). In particular embodiments, these identifiers can be of the form "GS_X_Y_Z" indicating all combinations of bands X, Y and Z, or of the form "GS_nb" indicating n-way combinations belonging to the group set b.

If a new band is to be added to a CA group set (step 508), the group set is redefined (as shown, for example, in FIGS. 3 and 4), and the group set identifier is updated. The UE processor can then receive a capability enquiry from the network on which a communication session is to be initiated (step 510). A capability message is returned (step 512) that includes the GS identifier for the CA band combinations.

If the network 120 does not support the GS identifier format (step 514), the UE processor receives a rejection message (step 516). The UE processor then proceeds (step 518) to revise the capability message. In this embodiment, the revised message includes a list of the CA band combinations as shown in FIGS. 2-4.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It will be appreciated that CA grouping according to various embodiments of the disclosure, examples of which are described herein, can be used in mobile communications including, but not limited to, fourth generation long term evolution (4G LTE) communications described in whole or in part by standards bodies such as Third Generation Partnership Project (3GPP). Embodiments of the disclosure may also be applicable to technologies evolving from 4G LTE, such as LTE Advanced (3GPP Release 10), LTE Advanced Pro (3GPP Release 13), and fifth generation radio access networks (5G RAN).

Figure 6:
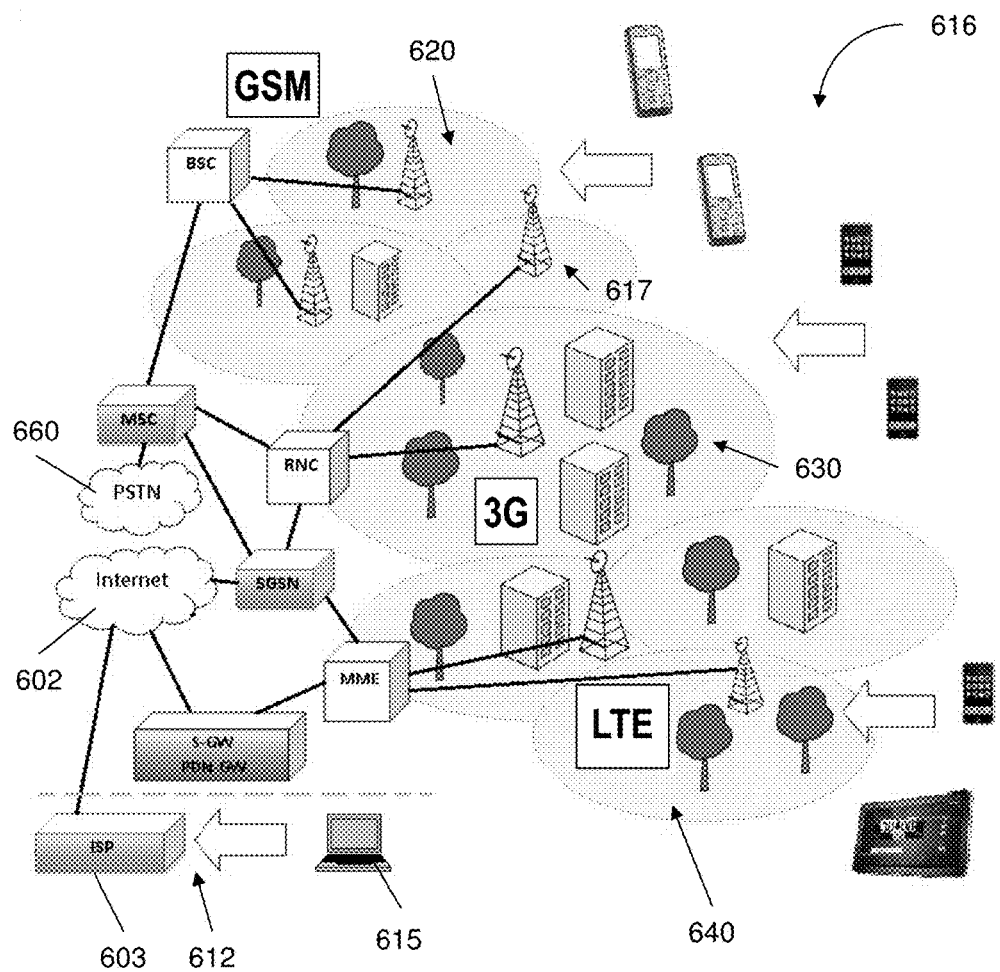
FIGS. 6-8 depict illustrative embodiments of systems that provide communications services to the UE of FIG. 1.

FIG. 6 depicts an illustrative embodiment of an architecture 600 for a network for interacting with mobile communication devices. According to an embodiment of the disclosure, a mobile device 616 (which may correspond to a UE 110) can connect with one or more of the networks shown in FIG. 6 using carrier aggregation. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a Global System for Mobile (GSM) network 620, a 3G network 630, and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616 can include a processing system including a processor and a memory that stores executable instructions that, when executed by the processing system, facilitate performance of operations. The operations can comprise receiving an enquiry regarding capability of the device to engage in a communication session over a network, identifying a plurality of component carriers available for carrier aggregation, and generating a group identifier for a group of combinations of the component carriers. The group identifier indicates the capability of the device to engage in the communication session using any of the combinations in the group. The operations can also comprise transmitting a message including the group identifier.

Figure 7:
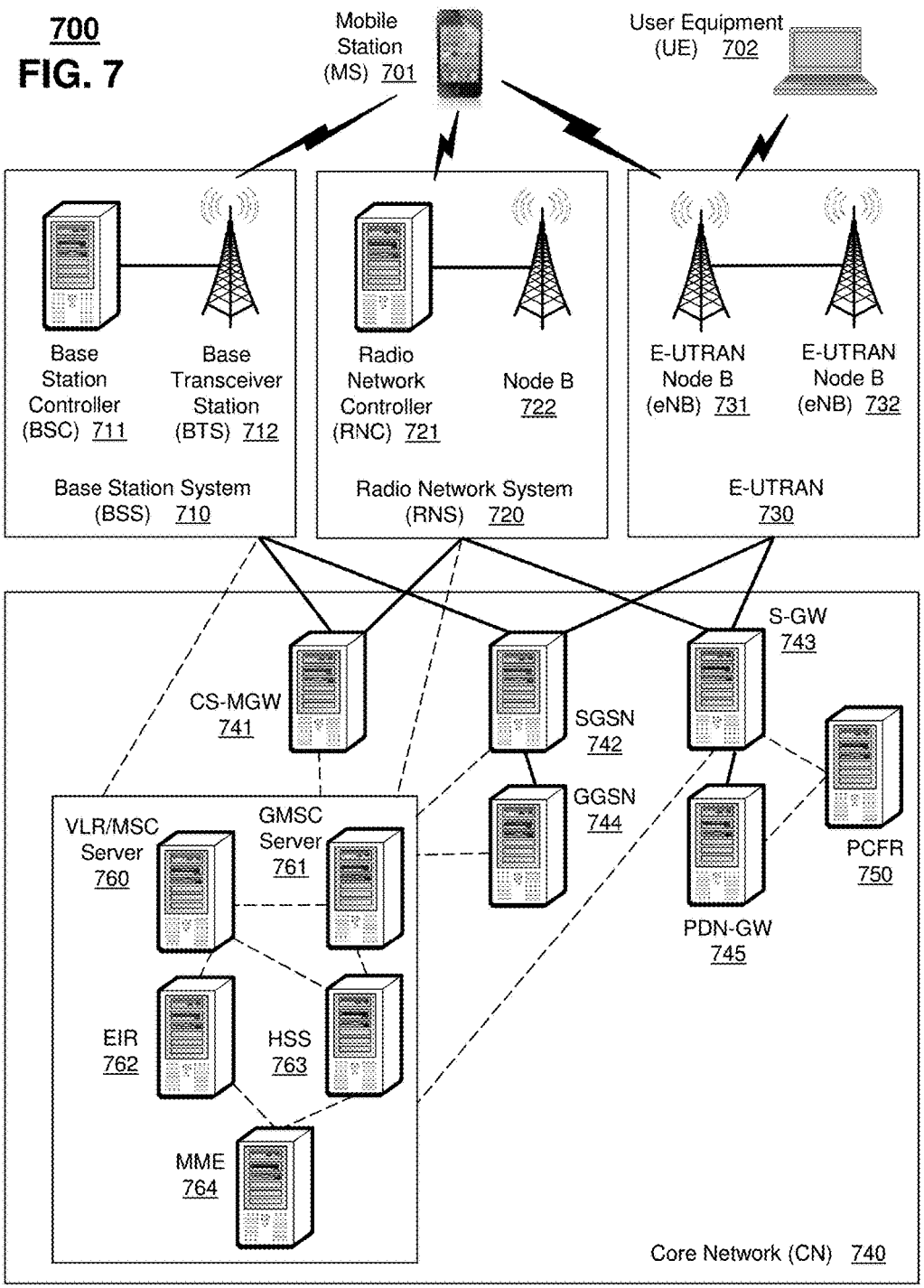

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate with one or more of the systems shown in FIG. 7 using carrier aggregation.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Figure 8:
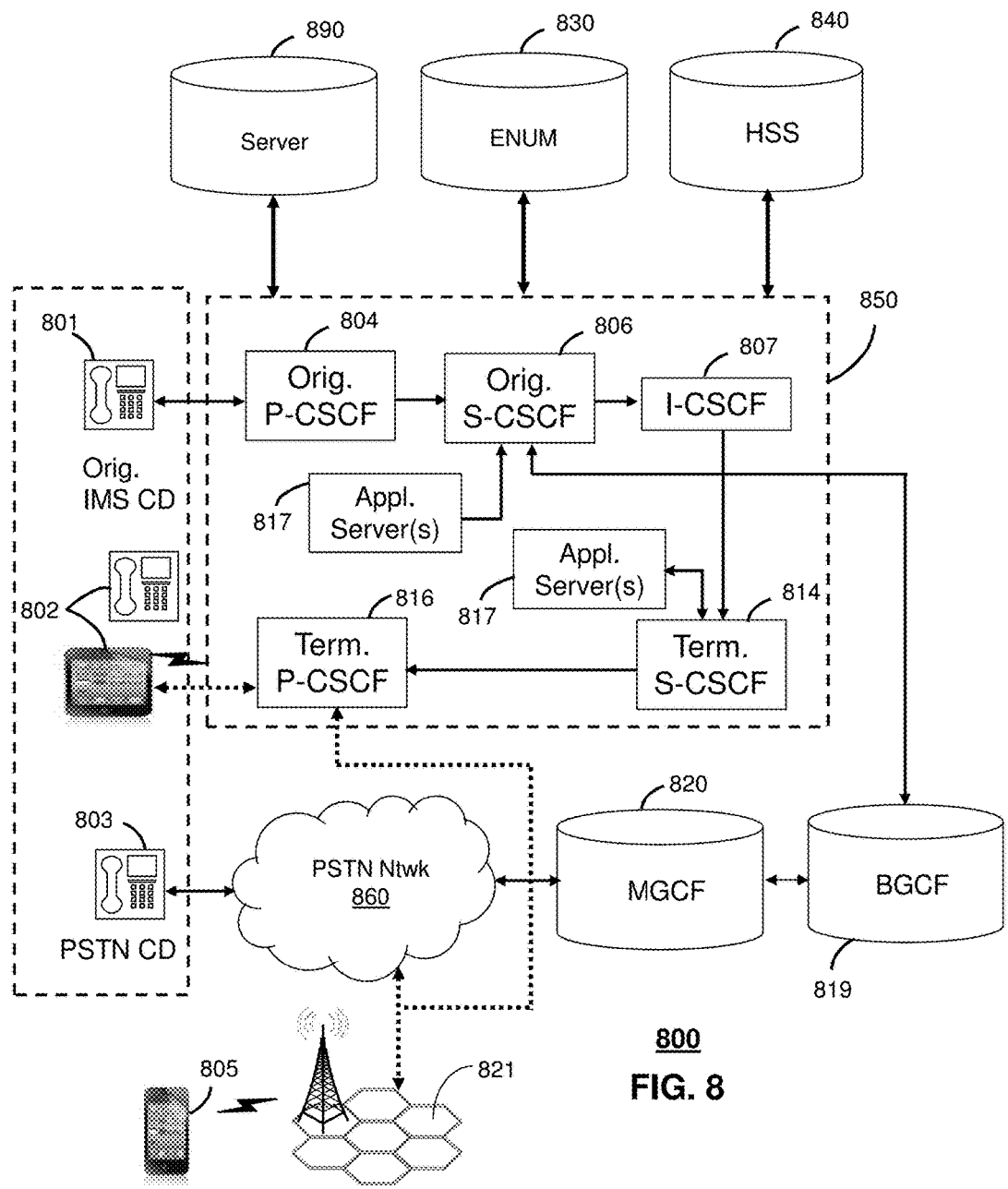

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with systems 100, 600 and/or 700 as another representative embodiment. In particular, system 800 when operably coupled with systems 100, 600 and/or 700 can facilitate performance of a method including receiving a message from a communication device regarding capability of the communication device to engage in a communication session over a network. The message can include a coded item corresponding to a predetermined group of carrier aggregation band combinations. The coded item indicates the capability of the communication device to engage in the communication session using any of the band combinations in the group. The method can also include facilitating the communication session in accordance with the capability.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 9:
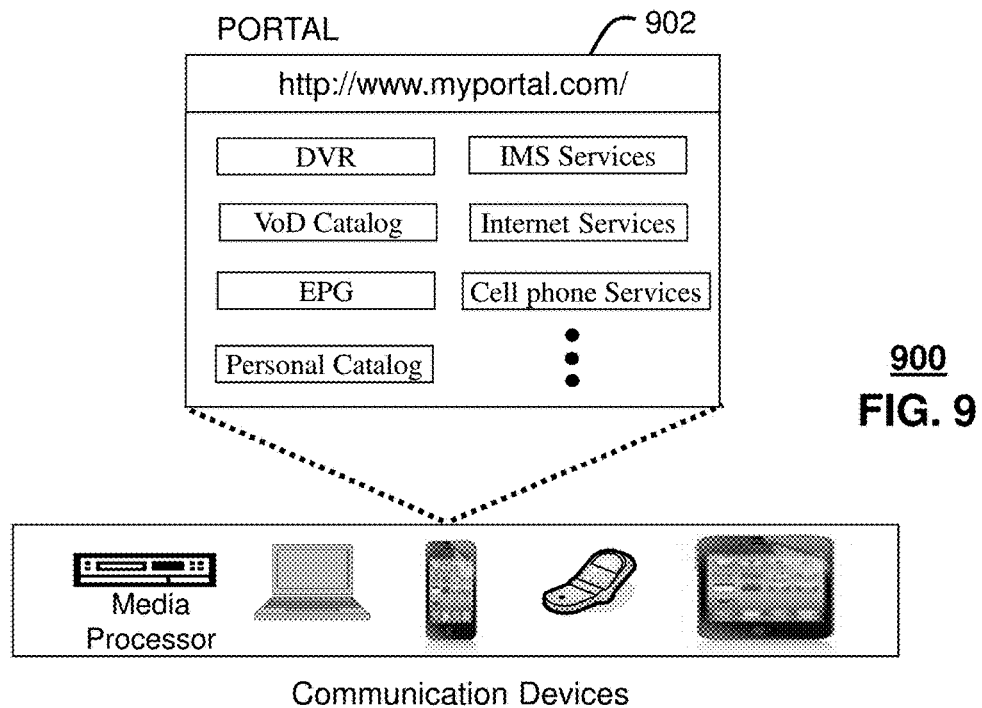
FIG. 9 depicts an illustrative embodiment of a web portal for interacting with the communication systems of FIGS. 6-8.

FIG. 9 depicts an illustrative embodiment of a web portal 902 of a communication system 900. Communication system 900 can be overlaid or operably coupled with communication system 600 and/or communication system 700 as another representative embodiment of a system using CA group set definition and encoding as shown in FIGS. 2-4. The web portal 602 can be used for managing services of communication systems 600-700. A web page of the web portal 902 can be accessed by a Uniform Resource Locator (URL) with an Internet browser using an Internet-capable communication device such as those described in FIGS. 1 and 6-8. The web portal 902 can be configured, for example, to access UE 702; in an embodiment, UE 702 comprises a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 902 can also be used for provisioning IMS services described earlier, provisioning Internet services, provisioning cellular phone services, and so on.

The web portal 902 can further be utilized to manage and provision software applications to adapt these applications as may be desired by subscribers and/or service providers of communication systems 600-800. For instance, users of services provided over networks shown in FIGS. 6-8 can log into their on-line accounts and provision server 763 or 840 with user profiles or contact information to the server to enable communication with devices described in FIGS. 1, 6, 7 and 8, and so on. Service providers can log onto an administrator account to provision, monitor and/or maintain the systems of FIGS. 1, 6, 7 and/or 8.

Figure 10:
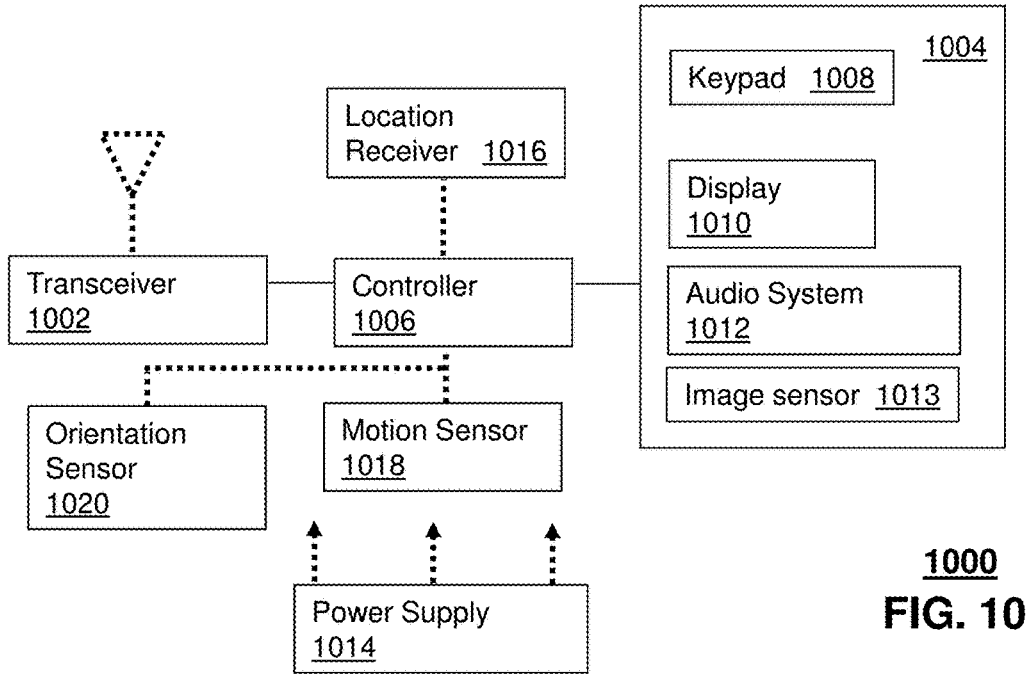
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1, 6, 7 and/or 8, and can be configured to perform portions of [method 500 of FIG. 5.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 7 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 7. These variant embodiments can be used in one or more embodiments of the subject disclosure.

The communication device 1000 can be adapted to perform the functions of UE devices of FIG. 1, the portable communication devices 616 of FIG. 6, and the mobile station 701 and UE 702 of FIG. 7, as well as the IMS CDs 801-802 and PSTN CDs 803-805 of FIG. 8. It will be appreciated that the communication device 1000 can also represent other devices that can operate in communication systems 600-800 of FIGS. 6-8'. In addition, the controller 1006 can be adapted in various embodiments to define CA group sets and encode GS identifiers.

Upon reviewing the aforementioned embodiments, it would be evident to an artisan with ordinary skill in the art that said embodiments can be modified, reduced, or enhanced without departing from the scope of the claims described below. For example, a computing device including a processor can be configured to monitor a certain frequency range for available component bands, and automatically add bands to the CA band group as those bands become available. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
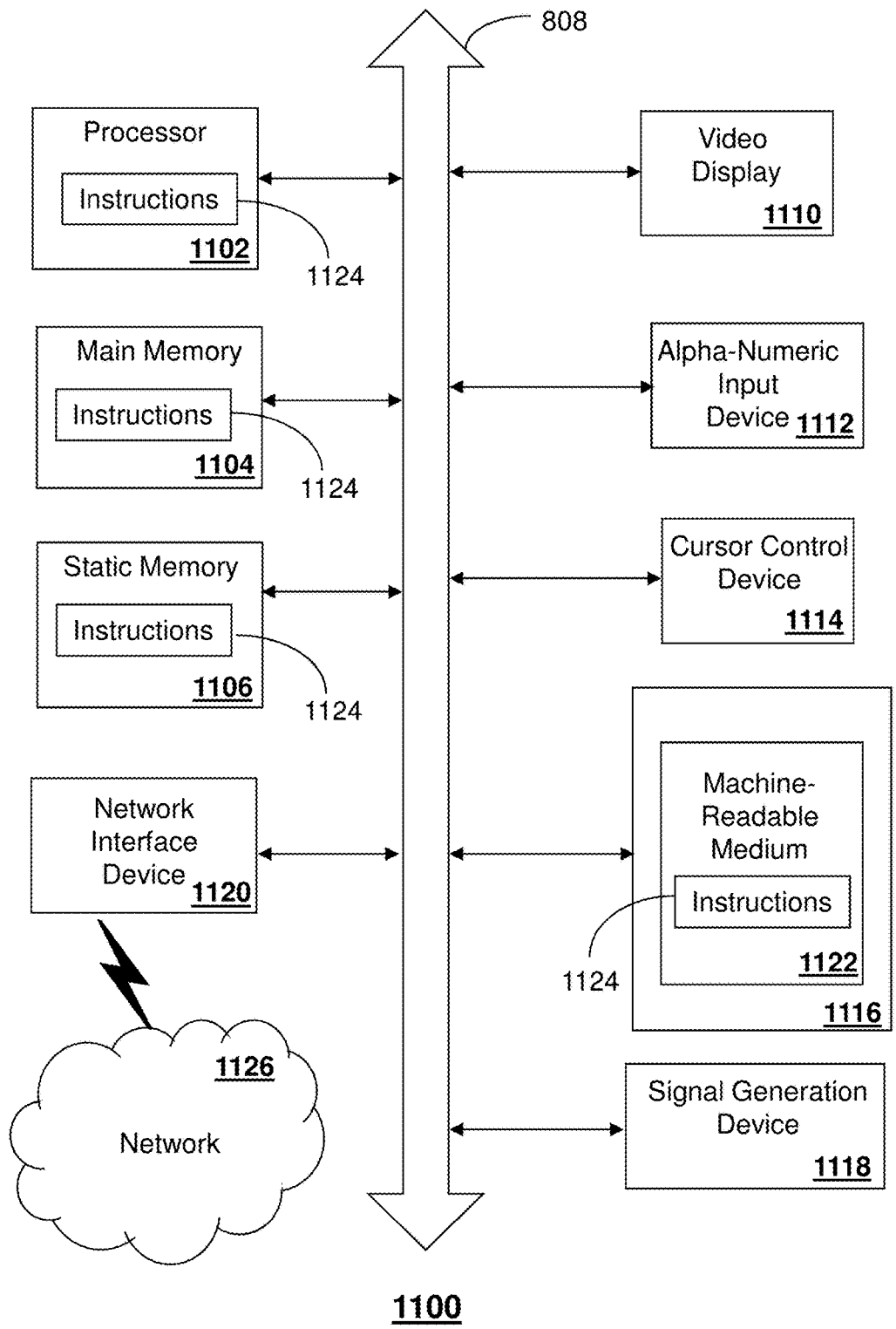
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as a processing system that receives a capability message including a coded item corresponding to a CA group set. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a processing system including a processor, a message from a communication device regarding capability of the communication device to engage in a communication session over a network, wherein the message includes a coded item corresponding to a predetermined group of carrier aggregation band combinations, the coded item thereby indicating capability of the communication device to engage in the communication session using any of the band combinations in the group;
   determining, by the processing system, whether the message is acceptable to the processing system;
   responsive to determining that the message is acceptable to the processing system, facilitating, by the processing system, the communication session in accordance with the capability; and
   responsive to determining that the message is not acceptable to the processing system, transmitting, by the processing system, a rejection message to the communication device.

2. The method of claim 1, wherein the coded item includes a number formed by a concatenation of a first code number and a second code number, the first code number identifying a number of bands in each combination of the group and the second code number identifying the predetermined group.

3. The method of claim 1, wherein each of the band combinations comprises a plurality of component bands, and wherein the coded item includes identifiers of the component bands.

4. The method of claim 3, wherein the coded item indicates the capability of the communication device to engage in the communication session using any combination of the component bands having identifiers in the coded item.

5. The method of claim 1, wherein the message comprises a first capability message, and wherein the determining that the first capability message is not acceptable to the processing system comprises determining that a format of the coded item is not supported by the network.

6. The method of claim 5, further comprising receiving, by the processing system, a second capability message, wherein the second capability message comprises a list of the band combinations in the group.

7. The method of claim 1, further comprising transmitting, by the processing system, a capability enquiry to the communication device, wherein the message is received in response to the capability enquiry.

8. The method of claim 7, wherein the capability enquiry and the message comprise Radio Resource Control (RRC) signals for the communication session.

9. A device, comprising:
   a processing system including a processor; and
   a memory that stores executable instructions that, when executed by the processing system, facilitate performance of operations, comprising:
   receiving an enquiry regarding capability of the device to engage in a communication session over a network;
   identifying a plurality of component carriers available for carrier aggregation;
   generating a group identifier for a group of combinations of the component carriers, the group identifier thereby indicating capability of the device to engage in the communication session using any of the combinations in the group;
   transmitting a first capability message including the group identifier to a network element; and
   responsive to receiving a rejection message indicating that the first capability message is not acceptable to the network element, transmitting a second capability message.

10. The device of claim 9, wherein the group identifier includes a number formed by a concatenation of a first code number and a second code number, the first code number indicating a number of carriers in each combination of the group and the second code number indicating the group.

11. The device of claim 9, wherein each of the combinations comprises at least two of the plurality of the component carriers, and wherein the group identifier includes an identifier for each of the component carriers in the group.

12. The device of claim 11, wherein the group identifier indicates the capability of the device to engage in the communication session using any combination of the component carriers having identifiers in the group identifier.

13. The device of claim 9, wherein the second capability message comprises a list of the combinations in the group.

14. The device of claim 9, wherein the enquiry and the message comprise Radio Resource Control (RRC) signals for the communication session.

15. A non-transitory machine-readable medium, comprising executable instructions that, when executed by a processing system including a processor, facilitate performance of operations, comprising:

receiving a message from a communication device regarding capability of the communication device to engage in a communication session over a network, wherein the message includes a group identifier for a predetermined group of carrier aggregation band combinations, the group identifier thereby indicating capability of the communication device to engage in the communication session using any of the band combinations in the group;

determining whether the message is acceptable to the network;

responsive to determining that the message is acceptable to the network, facilitating the communication session in accordance with the capability; and responsive to determining that the message is not acceptable, transmitting a rejection message to the communication device.

16. The non-transitory machine-readable medium of claim 15, wherein the group identifier includes a number formed by a concatenation of a first code number and a second code number, the first code number identifying a number of bands in each combination of the group and the second code number identifying the group.

17. The non-transitory machine-readable medium of claim 15, wherein each of the band combinations comprises a plurality of component bands, and wherein the group identifier includes an identifier for each of the component bands in the group.

18. The non-transitory machine-readable medium of claim 17, wherein the group identifier indicates the capability of the communication device to engage in the communication session using any combination of the component bands having identifiers in the group identifier.

19. The non-transitory machine-readable medium of claim 15, wherein the message comprises a first capability message, and wherein the determining that the first capability message is not acceptable comprises determining that a format of the group identifier is not supported by the network.

20. The non-transitory machine-readable medium of claim 19, wherein the operations further comprise receiving a second capability message, wherein the second capability message comprises a list of the band combinations in the group.

* * * * *